United States Patent Office 2,965,572
Patented Dec. 20, 1960

2,965,572

LUBRICANT COMPOSITION

James A. Wuellner, Gary, and Cecil G. Brannen, Munster, Ind., assignors to Standard Oil Company, Chicago, Ill., a corporation of Indiana No Drawing. Filed Apr. 30, 1957, Ser. No. 655,971

10 Claims. (Cl. 252—57)

This invention relates to improved lubricant compositions and more particularly it relates to hydrocarbon lubricants having improved viscosity-temperature characteristics.

It is well known that the viscosity of lubricating oils changes rapidly with changes in temperature, with different oils showing varying degress of viscosity change as the temperature increases or decreases. The relationship between viscosity and temperature is commonly expressed in the art as the viscosity index (V.I.) of the oil. Oils which change little in viscosity with variations in temperature have a greater viscosity index than do oils whose viscosity is materially affected by changes in temperature. Thus, for example, highly paraffinic oils have, in general, higher viscosity indices than do naphthenic oils, indicating that the viscosity of a highly paraffinic oil does not change as rapidly and as greatly with changes in temperature as does the viscosity of a naphthenic oil. The viscosity-temperature characteristics of a lubricant which is used in applications where wide variations in temperature are encountered, such as in the lubrication of automotive and airplane engines, are of great importance and lubricant compositions having high viscosity indices are highly desirable.

It is an object of this invention to provide hydrocarbon lubricants having improved viscosity-temperature characteristics. Another object is to provide lubricating oil compositions whose viscosity changes little with changes in temperature. A further object of the invention is to provide hydrocarbon oil lubricant compositions having improved viscosity indices. Other objects and advantages of the invention will become apparent from the following description thereof.

In accordance with this invention, the above objects, among others, are achieved by incorporating in a hydrocarbon oil an oil-soluble graft copolymer, hereinafter described, in small but effective proportions to improve the viscosity-temperature characteristics of the oil. The copolymer which is used is a graft copolymer of (A) an alkyl ester (I) of acrylic acid or methacrylic acid, said ester having at least 4 carbon atoms in the alkyl group, on (B) a copolymer of an ethylenically substituted aromatic compound selected from the group consisting of styrene, isopropyl styrene, and isopropyl-α-methylstyrene and an alkyl ester (II) of acrylic acid or methacrylic acid having at least 4 carbon atoms in the alkyl group, the molar ratio of ester (I), the substituted aromatic compound, and ester (II) in the graft copolymer being within the range from about 1:1:1 to about 50:1:50. Alkyl ester (I) can be the same as alkyl ester (II) although this is not a necessary condition. Examples of acrylic and methacrylic esters for use in forming the graft copolymers of the invention are butyl acrylate, hexyl acrylate, 2-ethylhexyl acrylate, octyl acrylate, nonyl acrylate, decyl acrylate, cetyl acrylate, butyl methacrylate, heptyl methacrylate, 2-ethylhexyl methacrylate, lauryl methacrylate, cetyl methacrylate, etc.

In preparing the graft copolymer to be used in the lubricant compositions of this invention there is first prepared, in accordance with any usual or suitable procedure in the polymerization art, a copolymer (the "backbone" copolymer) of acrylic or methacrylic ester (I) with styrene, isopropyl styrene, or isopropyl-α-methylstyrene, onto which copolymer ester (I) is then graft polymerized. Both alkyl ester (I) and alkyl ester (II) are esters of acrylic or methacrylic acid with a straight or branched chain alcohol having at least about 4 (e.g., about 4 to 18) carbon atoms, and preferably about 8 to 12 carbon atoms. Esters (I) and (II) used in forming the graft copolymer need not be the same. Any combination of esters selected from the defined classes can be used. The preferred aromatic compounds for use in forming the backbone copolymer are those which are ring-substituted with an isopropyl group, i.e., isopropyl styrene and isopropyl-α-methylstyrene. The isopropyl group may be in the ortho-, meta-, or para-position, although the meta- and particularly the para-substituted compounds are preferred, in order to avoid insofar as possible the effects of steric hindrance in the subsequent graft polymerization. The backbone copolymer can suitably be prepared by polymerizing a mixture of the ester and the styrene or substituted-styrene in aqueous emulsion in the presence of a suitable water soluble catalyst, e.g., a persulfate such as sodium persulfate. The molar ratio of the ester to styrene or substituted styrene in the backbone copolymer can range from about 1:1 to about 50:1 but is preferably from about 5:1 to about 25:1. The polymerization is continued until the molecular weight of the backbone copolymer is within the range from about 5,000 to 75,000 and preferably from about 15,000 to 50,000.

Onto the backbone copolymer chain thus formed there is subsequently graft polymerized acrylic or methacrylic ester (II). Active centers on the backbone copolymer which act as sites for grafting of ester (II) are formed by hydroperoxidation of the copolymer, which is accomplished by blowing the copolymer in solution in a suitable solvent such as benzene, toluene, n-hexane, etc., with oxygen or an oxygen-containing gas such as air at a temperature between about 70° F. and 300° F., and preferably between about 120° F. and 200° F. An organic peroxide or hydroperoxide, such as benzoyl peroxide or cumene hydroperoxide, may advantageously be present during the oxidation. As a result of this treatment hydroperoxide groups are former at the tertiary carbon atoms in the copolymer. With a copolymer which contains styrene the hydroperoxide groups are formed at the tertiary α-carbon atoms of the styrene in the backbone chain. With copolymers which contain isopropyl-substituted styrenes, hydroperoxidation occurs preferentially at the tertiary carbon of the isopropyl group.

The graft polymerization of acrylic or methacrylic ester (II) onto the backbone copolymer is accomplished by treating the copolymer hydroperoxide, produced as described above, with the ester in the presence of a reducing agent such as a ferrous or cobaltous salt. The graft polymerization can be carried out in solution in a suitable solvent such as benzene, cyclopentane, cyclohexane, n-hexane, etc., or in aqueous emulsion using fatty acid soaps, such as sodium stearate and sodium oleate, as emulsifying agents. The relative proportions of the constituents of the graft polymer are chosen such that the molar ratio of ester (I), the styrene or substituted-styrene, and ester (II) in the final graft copolymer is within the range from about 1:1:1 to about 50:1:50, and preferably within the range from about 5:1:1 to 25:1:25. For use as an additive to improve the viscosity characteristics of a lubricating oil, the graft copolymer should, of course, be oil-soluble. Graft copolymers having molecular weights within the range of about 20,000 to 150,000, and preferably from about 40,000 to about 70,000, can be used in the present invention.

The graft copolymer is suitably employed in hydrocarbon oils in amounts of about 0.1% to 15% by weight and preferably about 1% to 10% by weight. The oil can be any hydrocarbon oil having a Saybolt Universal viscosity above about 60 seconds at 100° F., for example, about 80 seconds at 100° F. to about 500 seconds at 210° F., although oils of lower or higher viscosity can also be used. The oil can be a petroleum distillate or residuum or a synthetic hydrocarbon oil or mixture of such oils.

The following example is given to illustrate one method of preparing the graft copolymers of our invention and is not intended to limit the scope thereof.

EXAMPLE I

Copolymerization of 2-ethyl hexyl acrylate and p-isopropyl-α-methylstyrene in the molar ratio of about 7:1 was carried out in an emulsion consisting of 5 grams of sodium stearate, 3 grams of sodium pyrophosphate and one gram of ethyl cellulose in 500 ml. of water at about 150°. To this emulsion was added 100 grams of 2-ethyl hexyl acrylate and 12.7 grams of p-isopropyl-α-methylstyrene. The mixture was emulsified with vigorous stirring and a catalyst, consisting of ½ gram each of sodium persulfate and sodium bisulfite, was added. The temperature was raised to about 200° F. and the polymerization was continued for two hours with stirring. The polymer was coagulated by addition of a solution of aluminum sulfate and then dissolved in benzene and precipitated into 4 volumes of methanol. Remaining impurities were removed by several leachings with hot methanol. The copolymer thus formed had a molecular weight of about 30,000. The hydroperoxide of this copolymer was formed by gently blowing a solution of the copolymer in benzene with air at about 120 to 140° F. for about 8 hours, in the presence of cumene hydroperoxide. The copolymer hydroperoxide was precipitated by pouring the benzene solution into methanol and remaining impurities were removed by several leachings with hot methanol.

Graft polymerization of 2-ethyl hexyl acrylate onto the copolymer was carried out in the following manner. The copolymer hydroperoxide made as described above was dissolved in benzene and an emulsion was formed consisting of this solution, about 1 liter $H_2O$, 10 grams sodium stearate, 10 grams sodium pyrophosphate, 5 grams ethyl cellulose, 5 grams $FeSO_4 \cdot 7H_2O$ and 150 ml. 2-ethyl hexyl acrylate. This mixture was emulsified with vigorous stirring and the polymerization carried out for about 6 hours at about 70–100° F. under an atmosphere of nitrogen. The emulsion was broken with a mineral acid and hexane was added to dissolve the graft copolymer. Impurities were removed by washing the hexane solution with aqueous methanol followed by precipitation of the graft copolymer into and leaching with methanol. After drying in a vacuum oven at 200° F. the product was a clear, highly viscous, tacky, semi-solid.

Other graft polymers using p-isopropyl-α-methylstyrene and lauryl methacrylate or 2-ethyl hexyl acrylate in varying molar ratios in the backbone chain were prepared in a similar manner.

The effectiveness of the graft copolymers of this invention in improving the V.I. of hydrocarbon oils is demonstrated by the data in Table I, which show the effectiveness as viscosity index improvers of several graft copolymers made in accordance with this invention and having the indicated composition. The extent of grafting of the graft monomer (i.e., ester II) onto the backbone copolymer is indicated by the increase in the quantity ($n_{sp}/C$) which represents the ratio of the specific viscosity $n_{sp}$ (which is equal to $$\frac{n}{n_0} - 1$$

where $n$ is the viscosity of a solution of the polymer and $n_0$ is the viscosity of the solvent) to the concentration $C$ of a solution of the polymer in toluene. An increase in this quantity indicates an increase in the average molecular weight of the copolymer and thus is indicative of the extent of graft polymerization of the graft monomer.

Table 1

| Backbone Copolymer | | | Backbone Copolymer, $n_{sp}/C^1$ | Graft Monomer | Graft Copolymer, $n_{sp}/C^1$ | Percent In 5W Base Oil[2] | Vis., 100° F. cstks. | Vis., 210° F. cstks. | V.I. |
|---|---|---|---|---|---|---|---|---|---|
| Moles 2-ethyl hexyl acrylate | Moles lauryl methacrylate | Moles p-isopropyl-α-methyl styrene | | | | | | | |
| 5 | ------ | 1 | 0.188 | 2-ethyl hexyl acrylate. | 0.258 | 1 | 21.40 | 4.26 | 119 |
| | | | | | | 2 | 23.93 | 4.70 | 131 |
| | | | | | | 3 | 26.85 | 5.18 | 139 |
| 7 | ------ | 1 | 0.528 | -----do--------- | 1.41 | 1 | 27.1 | 5.47 | 147 |
| | | | | | | 2 | 38.5 | 7.67 | 152 |
| | | | | | | 3 | 53.0 | 10.50 | 153 |
| 7 | ------ | 1 | 1.31 | -----do--------- | 2.1 | 1 | 31.72 | 6.49 | 152 |
| | | | | | | 2 | 40.36 | 8.44 | 156 |
| | | | | | | 3 | 49.84 | 10.46 | 156 |
| 10 | ------ | 1 | 0.715 | -----do--------- | 0.758 | 1 | 24.48 | 4.86 | 138 |
| | | | | | | 2 | 31.42 | 6.27 | 150 |
| | | | | | | 3 | 39.28 | 7.88 | 153 |
| ------ | 7 | 1 | ------ | -----do--------- | ------ | 1 | 22.25 | 4.43 | 127 |
| | | | | | | 2 | 26.45 | 5.27 | 142 |
| | | | | | | 3 | 31.00 | 6.19 | 149 |

[1] In toluene solution.
[2] V.I. of base oil=90.

The graft copolymers of this invention can be used alone in hydrocarbon oils, or if desired, can be employed in combination with other additives, for example, pour-point depressors, detergent-type additives, corrosion inhibitors, antioxidants, sludge inhibitors, metal deactivators, E.P. agents, etc.

While we have described out invention by reference to certain specific embodiments thereof, these have been given by way of illustration only and the invention should not be limited thereto, but includes within its scope modifications and variations as come within the spirit of the appended claims.

Having described our invention, we claim:

1. A lubricant composition comprising a major proportion of a hydrocarbon lubricating oil and a small proportion, sufficient to improve the viscosity index of said hydrocarbon lubricating oil, of a graft copolymer product prepared by polymerizing a mixture of an aromatic compound selected from the group consisting of styrene, isopropyl styrene, and isopropyl-α-methylstyrene and a first ester (I) selected from the class consisting of alkyl acrylates and alkyl methacrylates wherein the alkyl groups contain at least 4 carbon atoms to form a backbone copolymer of said aromatic compound and said first ester having a molar ratio of said first ester to said aromatic compound within the range of from about 1:1 to about 50:1 and a molecular weight within the range of from about 5,000 to 75,000, hydroperoxidizing said backbone copolymer and reacting the hydroperoxidized backbone copolymer with a second ester (II) selected from the class consisting of alkyl acrylates and alkyl methacrylates wherein the alkyl groups contain at least 4 carbon atoms to form a graft copolymer product having a molar ratio of said first ester to said aromatic compound to said second ester of from about 1:1:1 to about 50:1:50 and having a molecular weight in the range of from about 20,000 to about 150,000.

2. The lubricant composition of claim 1 in which said esters (I and II) are alkyl acrylates having from about 4 to 18 carbon atoms in the alkyl group.

3. The lubricant composition of claim 1 in which said esters (I and II) are alkyl methacrylates having from about 4 to about 18 carbon atoms in the alkyl group.

4. The lubricant composition of claim 1 in which one of said esters (I and II) is an alkyl acrylate having from about 4 to about 18 carbon atoms in the alkyl group and the other of said esters is an alkyl methacrylate having from about 4 to about 18 carbon atoms in the alkyl group.

5. A lubricant composition comprising a major proportion of a hydrocarbon lubricating oil and from about 0.1 to about 10% by weight of a graft copolymer product prepared by polymerizing a mixture of p-isopropyl-α-methylstyrene and a first ester (I) selected from the class consisting of alkyl acrylates and alkyl methacrylates wherein the alkyl groups contain from about 8 to about 12 carbon atoms to form a backbone copolymer having a molar ratio of said first ester to said p-isopropyl-α-methylstyrene within the range of from about 5:1 to about 25:1 and a molecular weight within the range of from about 15,000 to 50,000, hydroperoxidizing said backbone copolymer, and reacting the hydroperoxidized backbone copolymer in the presence of a reducing agent with a second ester (II) selected from the class consisting of alkyl acrylates and alkyl methacrylates wherein the alkyl groups contain from about 8 to about 12 carbon atoms to form a graft copolymer product having a molar ratio of said first ester to said p-isopropyl-α-methylstyrene to said second ester of from about 5:1:1 to about 25:1:25 and having a molecular weight in the range of from about 40,000 to about 70,000.

6. The lubricant composition of claim 5 in which said esters (I and II) are 2-ethyl hexyl acrylate.

7. The lubricant composition of claim 5 in which said ester (I) is 2-ethyl hexyl acrylate and said ester (II) is lauryl methacrylate.

8. The lubricant composition of claim 5 in which said esters (I and II) are butyl methacrylate.

9. The lubricant composition of claim 5 in which said ester (I) is lauryl methacrylate and said ester (II) is butyl methacrylate.

10. The method of improving the viscosity index of a hydrocarbon lubricating oil which method comprises adding to said oil from about 0.1 to about 10 weight percent of a graft copolymer product prepared by polymerizing a mixture of an aromatic compound selected from the group consisting of styrene, isopropyl styrene, and isopropyl-α-methyl styrene and a first ester (I) selected from the class consisting of alkyl acrylates and alkyl methacrylates wherein the alkyl groups contain from 8 to about 12 carbon atoms to form a backbone copolymer of said aromatic compound and said first ester having a molar ratio of said first ester to said aromatic compound within the range of from about 5:1 to about 25:1 and a molecular weight within the range of from about 15,000 to about 50,000, hydroperoxidizing said backbone copolymer, and reacting the hydroperoxidized backbone copolymer in the presence of a reducing agent with a second ester (II) selected from the class consisting of alkyl acrylates and alkyl methacrylates wherein the alkyl groups contain from 8 to about 12 carbon atoms to form a graft copolymer product having a molar ratio of said first ester to said aromatic compound to said second ester of from about 5:1:1 to about 25:1:25 and having a molecular weight in the range of from about 40,000 to 70,000.

References Cited in the file of this patent

UNITED STATES PATENTS

| | | |
|---|---|---|
| 2,366,517 | Gleason | Jan. 2, 1945 |
| 2,572,557 | Butler | Oct. 23, 1951 |
| 2,610,962 | Smyers et al. | Sept. 16, 1952 |
| 2,837,496 | Vandenberg | June 3, 1958 |

FOREIGN PATENTS

| | | |
|---|---|---|
| 161,292 | Australia | Feb. 21, 1955 |

OTHER REFERENCES

"Jour. of Polymer Science," 1955, vol. XVI, pages 345–355.